(12) United States Patent
Kikugawa et al.

(10) Patent No.: US 7,852,722 B2
(45) Date of Patent: Dec. 14, 2010

(54) OPTICAL DISK APPARATUS AND PLAYBACK SIGNAL PROCESSING METHOD

(75) Inventors: Atsushi Kikugawa, Tokyo (JP); Hiroyuki Minemura, Kokubunji (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1035 days.

(21) Appl. No.: 11/488,625

(22) Filed: Jul. 19, 2006

(65) Prior Publication Data

US 2007/0242580 A1    Oct. 18, 2007

(30) Foreign Application Priority Data

Apr. 12, 2006    (JP)    ............... 2006-109352

(51) Int. Cl.
G11B 5/58    (2006.01)
G11B 11/00    (2006.01)
G11B 5/09    (2006.01)
G11B 20/10    (2006.01)
G11B 27/36    (2006.01)
G11B 7/00    (2006.01)
H04N 5/76    (2006.01)

(52) U.S. Cl. ............... 369/53.12; 369/53.31; 369/59.15; 369/124.01

(58) Field of Classification Search ............... 369/53.12, 369/53.31, 59.15, 124.01
See application file for complete search history.

(56) References Cited

U.S. PATENT DOCUMENTS

| | | | |
|---|---|---|---|
| 6,084,733 A | | 7/2000 | Ohzeki et al. |
| 6,310,845 B1* | | 10/2001 | Kanenaga et al. .......... 369/53.1 |
| 2002/0001265 A1 | | 1/2002 | Tateishi et al. |
| 2002/0159350 A1* | | 10/2002 | Ogura et al. ............. 369/47.35 |
| 2003/0103426 A1* | | 6/2003 | Fujimori .................. 369/44.36 |
| 2003/0169665 A1* | | 9/2003 | Miyashita et al. ......... 369/59.22 |
| 2003/0174622 A1* | | 9/2003 | Nagai et al. .............. 369/59.22 |
| 2005/0078580 A1* | | 4/2005 | Kochale et al. .......... 369/53.15 |
| 2005/0094539 A1 | | 5/2005 | Minemura et al. |
| 2005/0254389 A1 | | 11/2005 | Minemura et al. |
| 2007/0086315 A1* | | 4/2007 | Huang et al. ........... 369/124.11 |

FOREIGN PATENT DOCUMENTS

JP    5-120703    5/1993

(Continued)

OTHER PUBLICATIONS

U.S. Appl. No. 11/092,872, filed Mar. 30, 2005, Minemura.

(Continued)

*Primary Examiner*—Jason C Olson
*Assistant Examiner*—Nicholas Lee
(74) *Attorney, Agent, or Firm*—Antonelli, Terry, Stout & Kraus, LLP.

(57) ABSTRACT

Provided is an optical disk apparatus which has high read retry ability and high compatibility by performing a proper verify for other apparatuses. The optical disk apparatus includes a playback system capable of arbitrarily changing playback performance, and means which detects and determines a factor causing a read error. Moreover, a read retry is performed by use of playback parameters corresponding to the factor causing the read error. Furthermore, a verify is performed with the playback performance of the playback system lowered.

5 Claims, 9 Drawing Sheets

1:disc, 2:pickup, 3:read channel, 4:ECC decoder, 5: defect detector, 6:controller

FOREIGN PATENT DOCUMENTS

| | | |
|---|---|---|
| JP | 5-242659 | 9/1993 |
| JP | 6-274890 | 9/1994 |
| JP | 9-219067 | 8/1997 |
| JP | 10-134528 | 5/1998 |
| JP | 11-283336 | 10/1999 |
| JP | 11-296987 | 10/1999 |
| JP | 2001-307347 | 11/2001 |
| JP | 2002-197682 | 7/2002 |
| JP | 2005-135549 | 5/2005 |
| JP | 2005-216364 | 8/2005 |
| JP | 2005-310238 | 11/2005 |
| JP | 2005-327367 | 11/2005 |

OTHER PUBLICATIONS

U.S. Appl. No. 11/237,753, filed Sep. 29, 2005, Minemura.
U.S. Appl. No. 11/236,742, filed Sep. 28, 2005, Minemura.
U.S. Appl. No. 11/236,801, filed Sep. 28, 2005, Kikugawa.
Official Action issued in Japanese Patent Application No. 2006-109352 on Mar. 16, 2010.

* cited by examiner

FIG. 1

1:disc, 2:pickup, 3:read channel, 4:ECC decoder, 5: defect detector, 6:controller

1 address unit

FIG. 5

| speed | Tracking gain | Focusing gain |
|---|---|---|
| 4X | UP (1 to 3 dB) | default |
| 4X | default | UP (1 to 3 dB) |
| 4X | UP (1 to 3 dB) | UP (1 to 3 dB) |
| 2X | UP (1 to 3 dB) | default |
| 2X | default | UP (1 to 3 dB) |
| 2X | UP (1 to 3 dB) | UP (1 to 3 dB) |

FIG. 6

| Tracking gain | Focusing gain | Adaptive Viterbi decoder study time constant | Adaptive EQ study time constant |
|---|---|---|---|
| DOWN (1 to 3 dB) | default | default | default |
| DOWN 3 dB | default | 70% | default |
| DOWN 3 dB | default | default | 70% |
| DOWN 3 dB | default | 50% | default |
| DOWN 3 dB | default | default | 50% |
| DOWN 3 dB | DOWN 3 dB | default | default |

*Iterate each settings for three time.

FIG. 7

| speed | Analog equalizer boost | High-pass filter cutoff | notice |
|---|---|---|---|
| 4X | UP (1 to 3 dB) | default | Stabilize PLL (SNR) |
| 4X | default | UP (50kHz, 100kHz) | Suppress baseline fluctuation (fingerprint) |
| 4X | UP (1 to 3 dB) | UP (50kHz, 100kHz) | Execute all combinations |
| 2X | UP (1 to 3 dB) | default | |
| 2X | UP (1 to 3 dB) | UP (50kHz, 100kHz) | Execute all combinations |

FIG. 8

| speed | Phase comparator | Analog equalizer boost | notice |
|---|---|---|---|
| 4X | A | UP (1 to 6 dB) | Enhance 2T-edges |
| 4X | B | default | |
| 2X | A | UP (1 to 6 dB) | Enhance 2T-edges |
| 2X | B | default | |

OPTICAL DISK APPARATUS AND PLAYBACK SIGNAL PROCESSING METHOD

CLAIM OF PRIORITY

The present application claims priority from Japanese application JP 2006-109352 filed on Apr. 12, 2006, the content of which is hereby incorporated by reference into this application.

CROSS REFERENCE TO RELATED APPLICATION

U.S. patent application Ser. Nos. 11/092,872, 11/237,753, 11/236,742 and 11/236,801 are co-pending applications of this application. The contents of which are incorporated herein by cross-reference.

BACKGROUND OF THE INVENTION

1. Field of the Invention

The present invention relates to an optical disk apparatus and a method for processing a playback signal in the optical disk apparatus.

2. Description of the Related Art

One of distinguished features of an optical disk apparatus and a disk compliant with standards of DVD, Blu-ray Disc (BD) and the like is that a recording medium is commutative and recording and playback can be performed even when disks are exchanged between different apparatuses. Compatibility is an extremely important matter for an optical disk, and requirements for the compatibility are set as the standards. However, in reality, the compatibility may be lowered for various reasons. For example, recording may be performed in a state where laser power in recording widely deviates from its proper value for some reasons. Moreover, a surface of a disk recorded is scratched or stained and, as a result, the compatibility may be lowered.

In order to maintain the compatibility, it is needed not to make a disk which cannot or can hardly be played back by other apparatuses, when recording in the disk. Moreover, in playback, it is required that devices are made so as to hinder a read error from occurring as much as possible, even if a disk is in a bad condition including the case where the disk is defective or stained. Therefore, to improve playback performance of the optical disk apparatus is an essential requirement for enhancing the compatibility. Thus, playback ability has been enhanced by introducing various technologies, such as an adaptive target Viterbi decoder (synonymous with an adaptive Viterbi decoder), described in Japanese Patent Laid-Open No. Hei 11 (1999)-296987, for example, for dealing with the case where a playback signal has large asymmetry.

Moreover, except for the time of stream playback and the like, generally, when a read error occurs, a read retry is performed in order to acquire data in the cluster. In the read retry, trials have heretofore been done according to a pre-prepared retry parameter list without specifying a factor for a read error.

As a result of improving the playback performance of the optical disk apparatus, when confirmation playback (verify) after recording is performed under the same conditions as those of normal playback, detected symbol errors are few, even thought recording quality is significantly deteriorated by problems in recording. Accordingly, there will be more and more cases where the deterioration thereof cannot be identified. Consequently, in the case where a recording region of the disk is played back by different apparatuses, the read error is more likely to occur. That is, the compatibility is lowered.

Moreover, there is a wide variety of events which trigger the read error. In many cases, the read error is caused by an exceptional event. In the case where a degree of the error is minor, if playback is tried again under normal playback conditions, the playback is successfully performed with a considerable probability (simple retry). However, in the case where the degree thereof is major, a sufficiently high probability of success may not be expected unless drive operation parameters are changed at the time of read retry. In addition, a host which issues a read command generally determines that it is unable to read if the host cannot acquire data within a certain period of time after issuance of the command (timeout). Thus, the number of times of the read retries which can be executed is limited.

The major factors for the read error can be classified broadly into three groups, including a defect, a deviation and a SNR deficit. Moreover, there are differences in setting policies of playback parameters in the read retries corresponding to the respective factors. In the read retry, trials have heretofore been done according to a pre-prepared retry parameter list without specifying the factor for the read error (such a parameter list will be hereinafter called a retry list). Thus, in some occasion the trials have been done by using parameters which are absolutely invalid, or even have adverse effects. Moreover, since there is a limitation on the number of trials which can be executed, there is a problem that variations on effective trial parameters are limited. To be more specific, if the deviation is a cause of the read error, it is effective to increase or decrease a tracking or focusing gain, and to lower a play back speed. Meanwhile, if the defect is a cause of the read error, the procedures described above are more likely to have adverse effects.

SUMMARY OF THE INVENTION

An object of the present invention is to provide an optical disk apparatus which has high read retry ability and high compatibility with other apparatuses.

An optical disk apparatus of the present invention includes a playback system capable of arbitrarily changing playback performance, and lowers the playback performance at the time of verify. Moreover, the optical disk apparatus includes: means which detects and determines a factor for a read error; and means which performs a read retry by use of a playback parameter corresponding to the factor causing the read error.

The present invention makes it possible to achieve high read retry ability and to perform a proper verify for other apparatuses. Moreover, it is possible to enhance ability to deal with a read error caused by an exceptional event. As a result, an optical disk apparatus with high compatibility can be provided.

DETAILED DESCRIPTION OF THE PREFERRED EMBODIMENTS

With reference to the drawings, an embodiment of the present invention will be described below.

(Retry Using List Classified by Factor and Factor Detection)

A description will be given for a method for estimating a factor of a read error when occurring and for performing retry processing based on the result thereof. The factors of the read error are classified broadly into the three groups including the defect, the deviation and the SNR deficit as described above. Among those factors, the defect and the deviation can be detected with sufficient credibility. Therefore, by use of the results, the factors for the read error are classified into the three groups. Unless otherwise noted, the factor for the read error will hereinafter mean any one of the defect, the deviation and the SNR deficit. By applying a retry parameter list prepared for each of the factors, a more effective retry operation is performed in comparison with the conventional cases.

Figure 1:
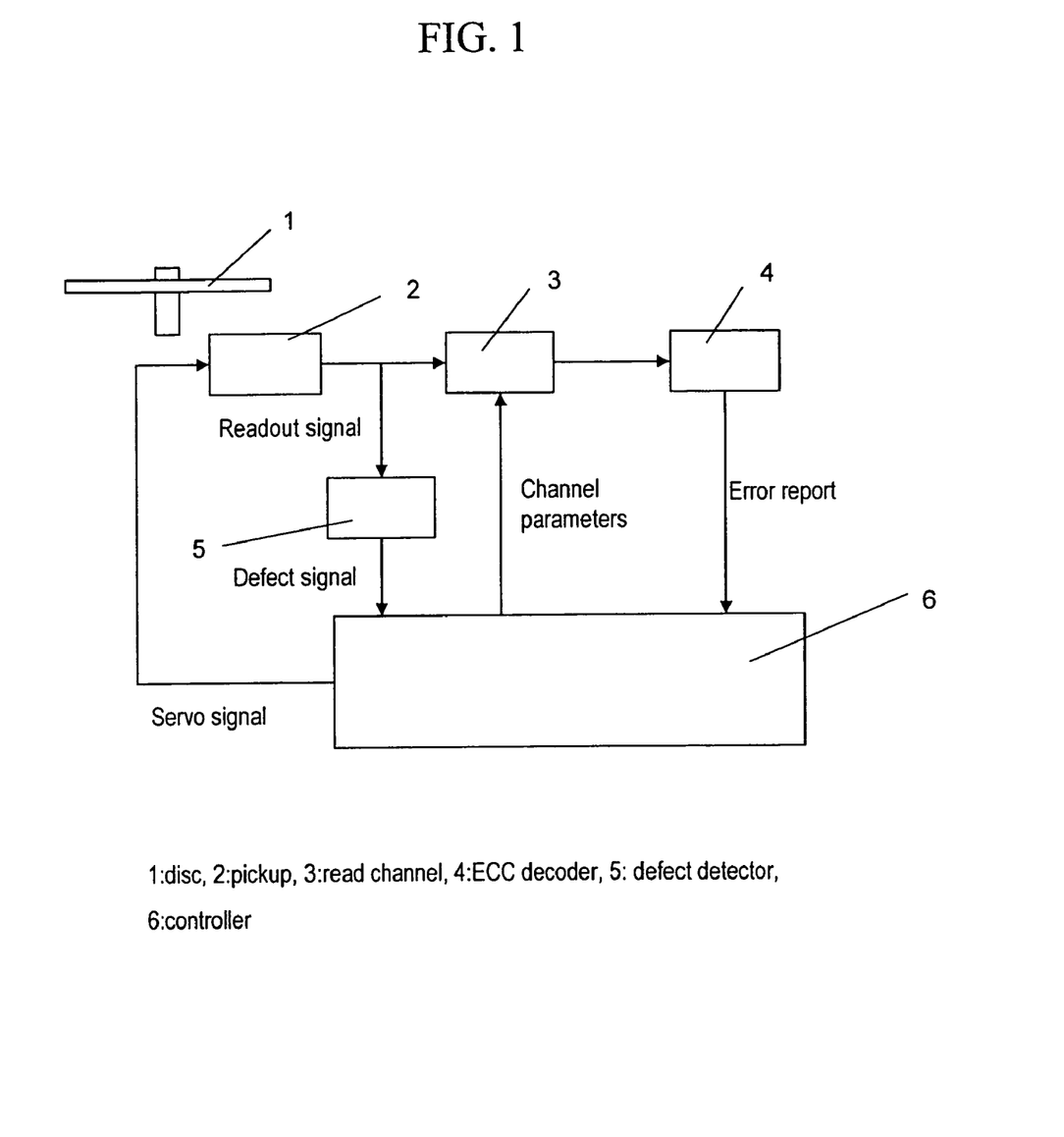
FIG. 1 is a diagram showing a schematic configuration of an optical disk apparatus according to the present invention.

FIG. 1 shows a schematic configuration of an optical disk apparatus (drive) according to the present invention. Here, only parts required to be described in relation to the present invention are shown, and the other parts are omitted. Similarly, details of the respective parts which can be easily understood by those skilled in the art are omitted.

Information recorded in a disk 1 is optically played back by use of a pickup 2 and is transduced into an electric signal. Thereafter, the electric signal is inputted to a read channel 3 which is a signal processing system. After being binarized by the read channel 3, the signal is processed in the manner of error correction processing and the like by an error correction code decoder 4. Thus, user data is retrieved. This is general description of normal playback operations. Generally, those operations are automatically performed in accordance with a sequence included in an LSI.

Figure 2:
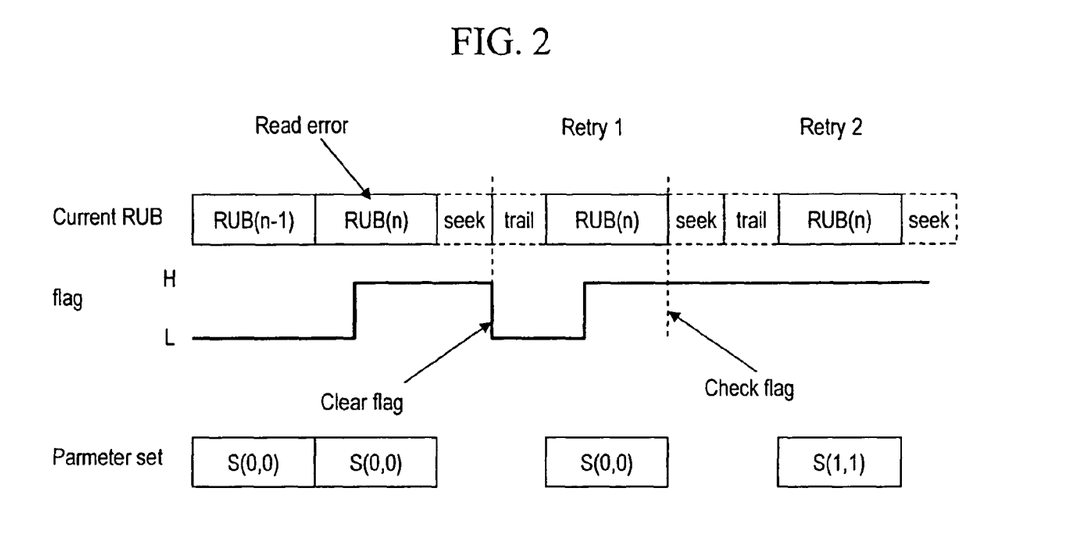
FIG. 2 is a diagram showing read error factor detection and retry parameter setting timing.

Next, a description will be given for factor detection and a subsequent read retry operation. Here, for simplicity, the description will be given by assuming that a factor to be detected is only a defect. FIG. 2 shows a setting of read parameters in the factor detection, and timing for the setting. The top part of FIG. 2 shows a RUB (recording unit block) which is performing playback, the middle part thereof shows a state of a defect detection flag, and the bottom part thereof shows a set of playback parameters used in the event.

It is assumed that, while playback is continuously performed for a RUB (n−2), a RUB (n−1) and a RUB (n), a read error is currently generated in the RUB (n). When the read error occurs, a controller 6 starts a retry operation. In a first retry, a simple retry is performed. In order to read the RUB (n) again, it is required that seek is done. In the seek operation, a pickup position is returned to a cluster locating several clusters before a target cluster, and therefrom tracks are trailed to reach the target cluster. In this event, as shown in FIG. 2, a defect detection flag is reset when the seek is completed. Thereafter, when the first retry of the target cluster is completed, it is determined whether or not a defect exists in a target region by referring to the defect detection flag.

Figure 3:
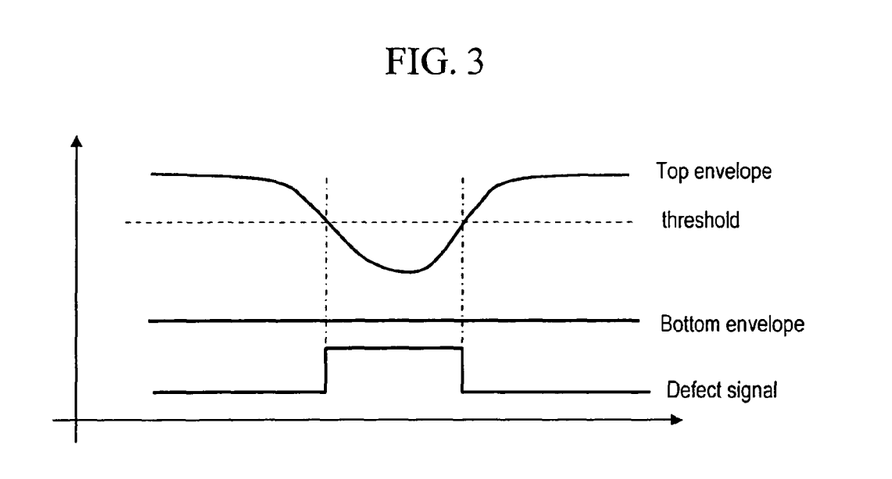
FIG. 3 is an explanatory diagram of a defect detection method.

The defect detection is performed by use of a defect detector 5. The defect detector 5 is a circuit which monitors a top envelope of a playback signal, as shown in FIG. 3, and which outputs a defect detection signal in the case where the amplitude which is not more than a threshold continues for a certain period of time or more. When the defect detection signal is outputted continuously for a certain period of time or more, the defect detection flag is set up. Note that, once a defect is detected, the defect detection flag is set to maintain a high level until the flag is reset. Thus, it is possible to guarantee that, when the first retry is completed, the state of the defect detection flag reflects the presence or absence of a defect detected from a time when the seek is completed to a time when the retry of the target cluster is completed. The reason why timing of resetting the defect detection flag is set before the target cluster is that a read error may be caused by jumping to a track other than the target due to an influence of a defect before the target cluster.

If the read error occurs even in the first retry (simple retry), a retry operation based on a result of a factor detection flag is performed. Since the factor to be detected is currently only the defect, the factors are classified into the defect and others. A playback parameter list for each of the factors at the time of retry is expressed as S (factor number, trial number). Moreover, a playback parameter list in normal playback is expressed as S (0, 0). Here it is assumed that a factor number of a defect is 1, and that of the others is 2. If the defect detection flag is set up, retries after the first retry are sequentially executed in the order of parameter lists S (1, 0), S (1, 1) and S (1, 2) until read is successfully performed.

Note that it can be easily understood by those skilled in the art that the controller 6 is configured of a micro-computer, a feedback controller, a universal memory and the like, as hardware; that operations thereof are controlled by firmware; and that the controller also includes a read parameter set used at the time of retry, and the like.

In the example of FIG. 1, only the defect is used as the factor to be detected. Even if a deviation detector for tracking and focusing is added to the configuration described above, the foregoing description can be applied without making almost any changes. In this case, factors are classified into the defect, the deviation, the SNR deficit, and others. The deviation is detected when amplitude of an error signal in a tracking feedback control circuit exceeds a certain value. The deviations of tracking and focusing can be individually detected. However, as to a frequency of occurrence of read errors due to the deviation, remarkably more errors are caused by tracking deviations. Thus, here, in consideration of system simplification, retry lists concerning tracking and focusing deviations are combined, and the same list is executed regardless of which one of the deviations is detected.

There may be a plurality of factors to be detected, and those factors may be detected at the same time. In preparation for the case where a plurality of read error factors are detected at the same time, a detection priority is determined. If a defect and a deviation are detected at the same time, the defect is prioritized. This is because there are many cases where a large tracking error occurs immediately after a playback light spot finishes passing on a long defect, and, even if a substantial read error factor is the defect, a deviation is often detected at the same time.

Figure 4:
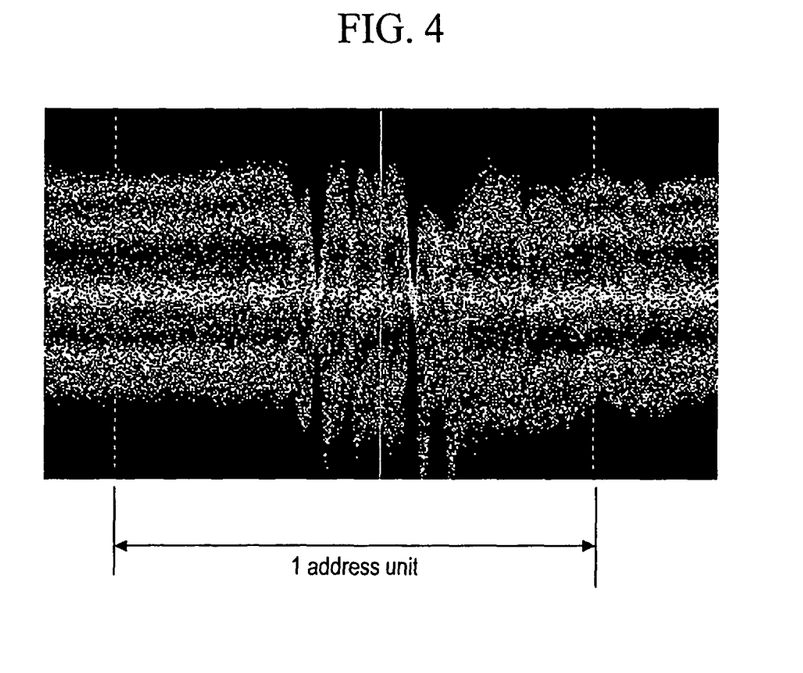
FIG. 4 is a diagram showing an example of playback signal disturbance caused by a fingerprint.

Moreover, a fingerprint has both of a defect-like element due to local extinction and a deviation-like element caused by refracting read light. Since extinction caused by the defect has a short period of duration, no defect detection flag is set up in most cases. However, the local extinction has a characteristic of appearing more than once within several cm. FIG. 4 shows an example of the case where a playback signal is disturbed by the fingerprint. Moreover, a deviation caused by the fingerprint has a long period of duration, but amplitude thereof is relatively small. Accordingly, the deviation is not normally targeted for the deviation detection. Therefore, playback parameters for dealing with a read error caused by the fingerprint are included in parameter lists of the SNR deficit and the others.

(Contents of List by Factor)

Here, a description will be given for contents of a retry list by each factor.

Figure 5:
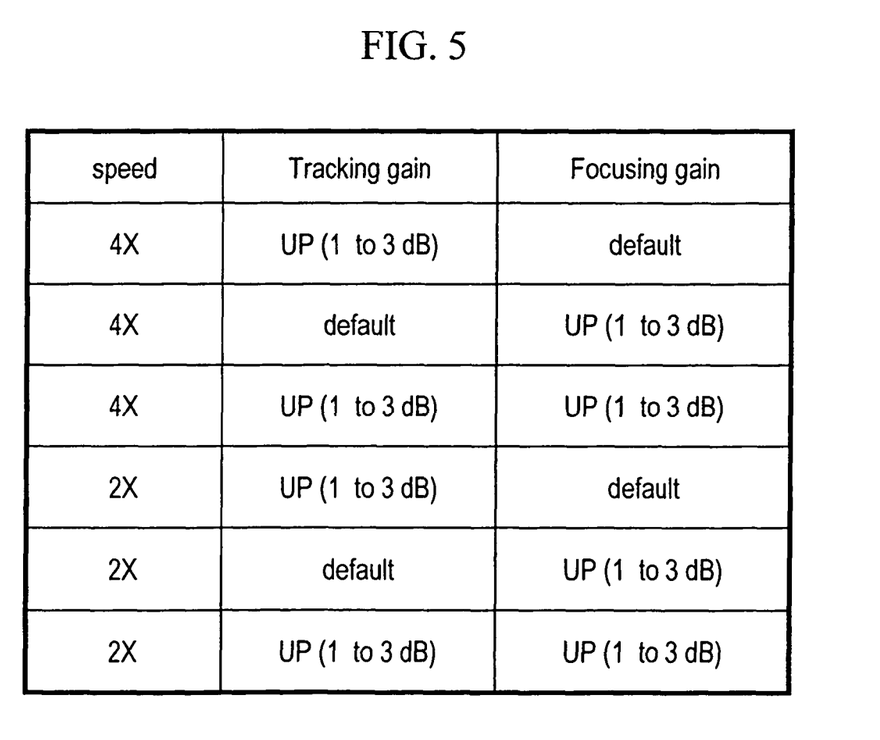
FIG. 5 is a diagram showing an example of a retry list for dealing with a deviation.

FIG. 5 shows an example (BD4X) of a retry list for dealing with a deviation. As described above, in consideration of system simplification, retry lists for dealing with tracking and focusing deviations are combined, and the same list is executed regardless of which one of the deviations is detected. Main effective parameters for dealing with the deviation are increases in feedback control gains of tracking and focusing, and reduction in a playback speed from 4× to 2×. The playback speed is important performance for the drive. Thus, the reduction in the playback speed is set in a lower level of the list in order to avoid as much as possible, although the reduction in the playback speed is expected to be effective as a retry parameter. The parameters in the retry list are applied sequentially from those set in an upper level of the list until read is successfully performed.

Figure 6:
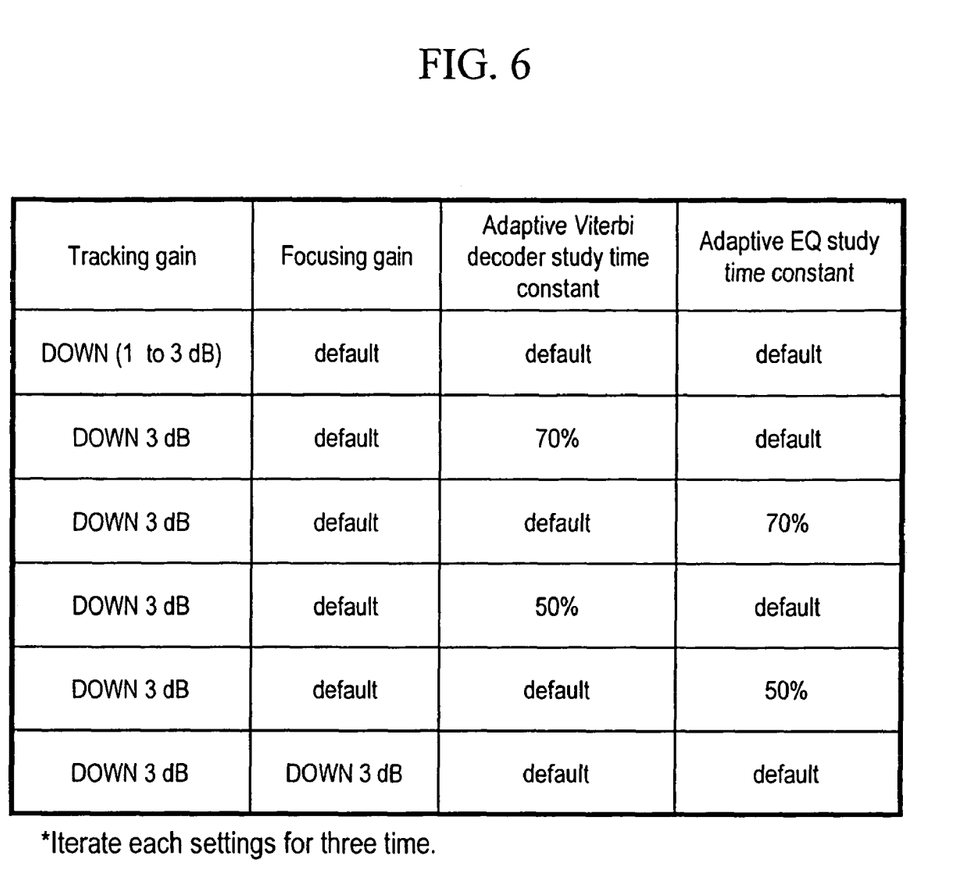
FIG. 6 is a diagram showing an example of a retry list for dealing with a defect.

Next, a description will be given for a list for dealing with a defect. With respect to a situation of a read error occurrence caused by the defect, there are mainly two cases including the case where a length of the defect is as long as an error correction limit, and the case where tracking is shifted off by the defect and a cluster on another track is played back. As to the former, since the number of errors statistically fluctuates at each trial, a considerable effect can be expected even by the simple retry. As to the latter, improvement can be expected by lowering a feedback gain to suppress an excessive fluctuation of a feedback system when entering into the defect. While passing on the defect, operations of a control system for tracking and focusing are held. However, since a time for which the operations can be held is limited by hardware restrictions, it may be rather disadvantageous to lower the playback speed. Thus, the playback speed is not lowered.

FIG. 6 shows an example of a retry list prepared by taking account of those described above. The contents of each trial are iterated for three times. Normally, when passing on the defect, adaptive operations of an adaptive equalizer and an adaptive Viterbi decoder are also held. Immediately after passing the defect, amplitude of a playback signal waveform and a dc offset level are changed under the influence of a transient response and the like. A certain effect can be expected also by reducing a study time constant of each of the adaptive equalizer and the adaptive Viterbi decoder in order to accelerate a response to the changes described above. The focusing gain is set in a lower level of the list, since an effect may be obtained.

Figure 7:
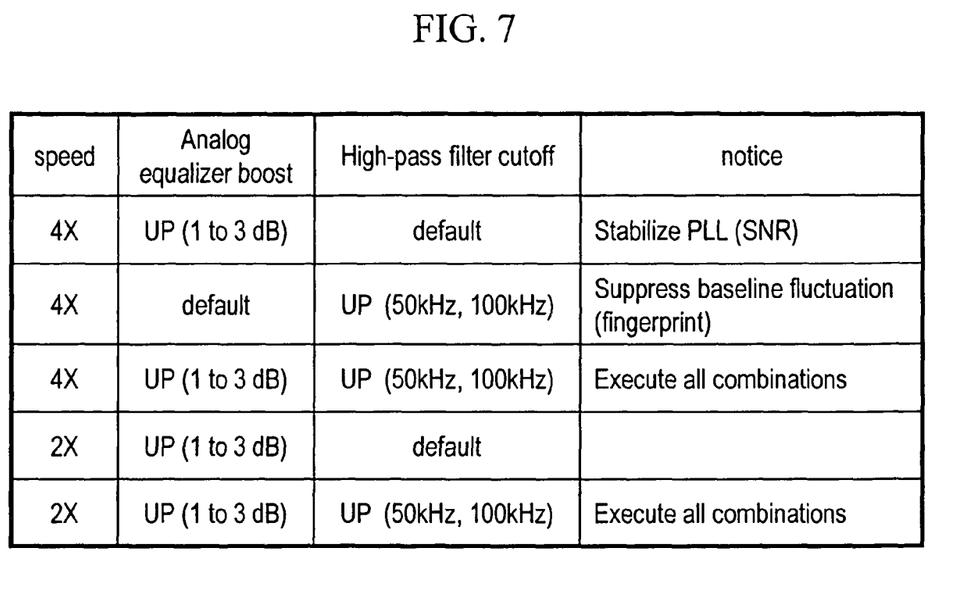
FIG. 7 is a diagram showing an example of a list for dealing with a SNR deficit and the fingerprint.

Next, a description will be given for a retry list for dealing with the SNR deficit and other factors. FIG. 7 shows an example of BD4X.

As described above, the retry list also includes measures against the fingerprint. Since the playback signal processing system of this drive includes the adaptive equalizer and the adaptive Viterbi decoder, even if a boost for a shortest mark/space signal is increased in the event of the SNR deficit, a direct effect on a binary discriminator cannot be expected. However, particularly, in a system, such as BD, where the shortest mark/space signal has poor jitter, operation clock jitter of the binary discriminator is suppressed by increasing the boost of the shortest mark/space signal. Thus, an error rate can be improved. This is because an operation clock of the binary discriminator is generated from a playback signal by use of a digital PLL.

As shown in FIG. 4, the fingerprint is characterized in that the local extinction appears more than once within several cm. As a result, there arises a problem that errors are increased by a change in a baseline (center of an eye-pattern) of a playback signal. In order to deal with the problem, a trial is performed by setting a cutoff frequency of a high-pass filter to be higher than usual. This trial involves deterioration in an error rate of a mark/space signal having a long run length. However, an effect of shortening a length of a burst error can be expected.

When the playback speed is lowered, a bandwidth of the playback signal processing system is reduced, and inputted noise power is reduced. As a result, improvement in the error rate can be expected. However, from the viewpoint of apparatus performance, lowering of the playback speed should be avoided as much as possible. Thus, the parameters are set in the lower level of the list.

(Isolated Block Playback)

Regarding the DVD, it is guaranteed in the standards that a block immediately before a block in which user data is recorded is not in an unrecorded state. Meanwhile, in the BD, a RUB including user data can exist immediately after an unrecorded region. Here, for convenience, the RUB immediately after the unrecorded region as described above is called an isolated block.

A problem arising in playback of the isolated block is that, since a block immediately before the isolated block is in an unrecorded state, a time allowed for a PLL (phase locked loop) of a data playback system to be locked with a playback signal clock is short. Assuming that a channel clock duration is T, it is required that the PLL is caused to lock at about 2700 T from the top of the block. If the playback signal has a good SNR, it is relatively easy to satisfy the requirement described above. However, even if the SNR of the playback signal from the block is originally bad and close to the playback limit, playback is demanded. Under such a situation, a read retry occurs with a considerable probability. The occurrence of the read retry is significantly influenced by the following. When the SNR of the playback signal is deteriorated, accuracy of phase comparison is lowered under the influence of noise, and thereby, the time required for the PLL to lock is significantly elongated. Therefore, by performing determination of a preceding unrecorded RUB in retry factor detection, a success rate of isolated block playback in the retry is improved.

Figure 8:
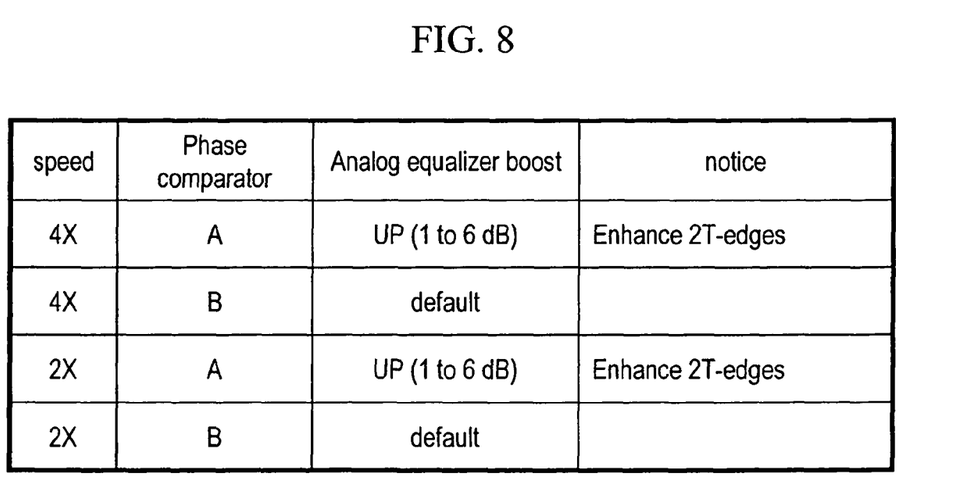
FIG. 8 is a diagram showing an example of a retry list for playback of an isolated block.

First, a description will be given for determination of an unrecorded RUB immediately before the RUB described above. In the case of a phase change recording medium, a reflectance of an unrecorded part is higher than that of a recorded part, and a modulation factor is 0. This state is the same as that obtained by reversing the relationship between the upper side and the lower side of the envelope in the defect detection, and thereby, detection thereof can be performed by use of a similar method. Moreover, a seek end position before the retry is several RUBs before the RUB. Thus, in order to determine that the preceding RUB is not yet recorded, it is determined whether or not an appearing unrecorded part is the preceding RUB, while an ADIP (address in pre-groove) is being monitored at the same time. If it is determined that the preceding RUB is not yet recorded, a retry list for the isolated block is executed. FIG. 8 shows an example of a retry list related to the isolated block playback. This retry list is characterized by switching a signal for performing the phase comparison. The details thereof will be described below.

Figure 9:
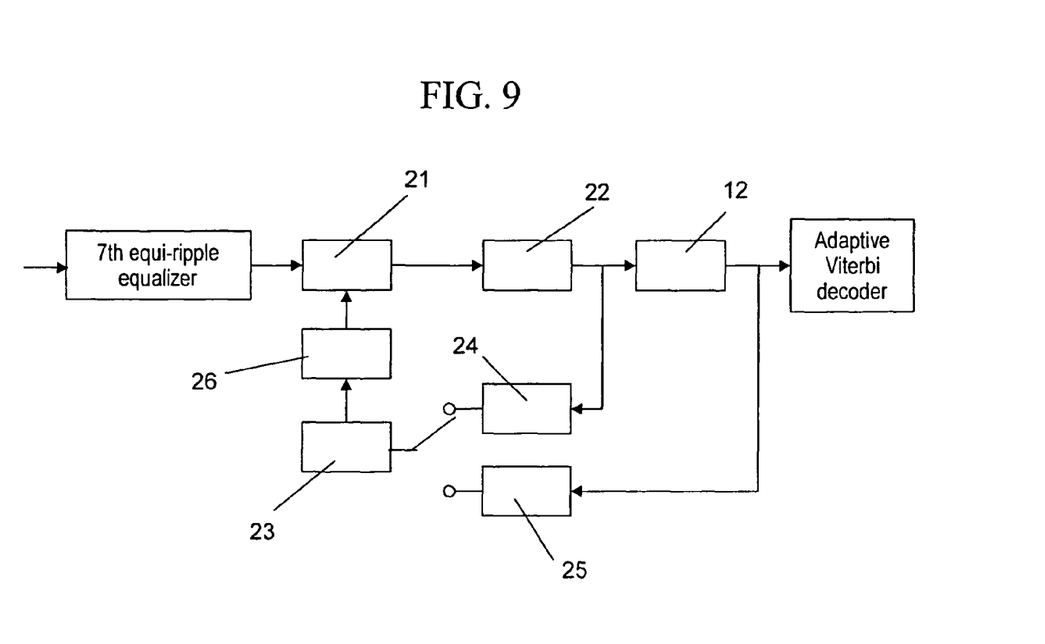
FIG. 9 is a diagram showing a configuration of a PLL.

In the playback signal processing system used here, as shown in FIG. 9, besides phase comparison by use of output of a normal ADC (analog to digital converter) 21, phase comparison by use of an adaptive equalizer output is also possible. In normal phase comparison, a phase error is detected by a phase comparator A 24 from the ADC output which has passed through a slicer 22. Moreover, a frequency and a phase of an output clock of a VCO (voltage controlled oscillator) 26 are controlled via a loop filter 23. Meanwhile, in the case where the phase comparison is performed by making use of an adaptive equalizer 12, a phase is detected from output of the adaptive equalizer by use of a phase comparator B 25. The adaptive equalizer 12 is a type of a FIR (finite impulse response) equalizer and output thereof has a large delay time. Thus, in the case where a playback signal has a good SNR, the time required to lock the PLL is elongated compared with the case of using the ADC output. However, since the FIR equalizer acts as a high-order low-pass filter, noise of an input signal to the phase comparator is reduced. Thus, the accuracy of the phase comparison is improved. As a result, the time required for the PLL to lock can be shortened.

Figure 10:
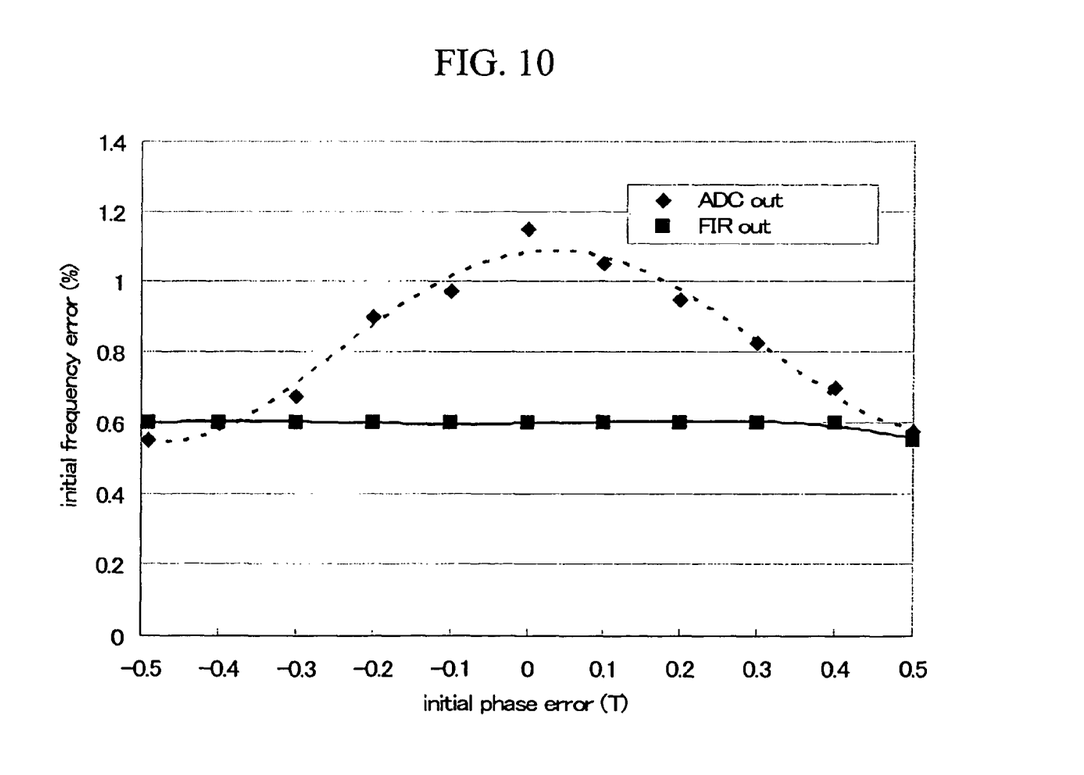
FIG. 10 is a graph showing a marginal curve of a PLL initial condition which enables playback of the isolated block.

FIG. 10 shows a simulation result of comparing the above two. The horizontal axis indicates an initial phase error, and the vertical axis indicates an initial frequency error. A pseudo-playback signal used in the simulation is obtained by combining waveforms based on an optical step response and superimposing white noise thereon. Noise amplitude is adjusted so as to set an average symbol error rate to $2 \times 10^2$ at PR (1, 2, 2, 1) ML channel. This means almost a limit state in which compatibility can be guaranteed between drives. Generally, the larger the absolute values of both of the initial phase error and the initial frequency error are, the more the time required for the PLL to lock tends to be elongated. In FIG. 10, the limit initial frequency errors at which the PLL can be locked within 2700 T after the PLL starts a pull-in operation are plotted, the initial frequency errors each being obtained for each initial phase error. In reality, even if the noise amplitude is the same, the initial frequency error at which the PLL can lock within allowed time differs depending on a noise signal waveform to be superimposed. That is, an allowable initial frequency error has a distribution. Thus, each plot in FIG. 10 is obtained by averaging values obtained by use of the sufficient number of different noise waveforms. Consequently, the curve in FIG. 10 indicates the center of the distribution. In other words, on the curve, a probability that the PLL can lock within the allowed time is 50%.

Variances at the initial phase error ±0.5 T at which the allowable initial frequency error is minimized are 0.15% and 0.038%, when the phase comparisons are performed by use of the ADC output and the adaptive equalizer output, respectively. The size of the allowable initial frequency error has approximately the same value in either case. Therefore, if the maximum initial frequency error allowed by the drive is 0.25%, a probability that the PLL cannot lock within the allowed time is about 4% when the ADC output is used, while it is virtually 0 when the adaptive equalizer output is used. Accordingly, even if there is a significant influence of noise, the isolated block can be played back with sufficient reliability by performing the retry using the adaptive equalizer output.

(Verify)

Figure 11:
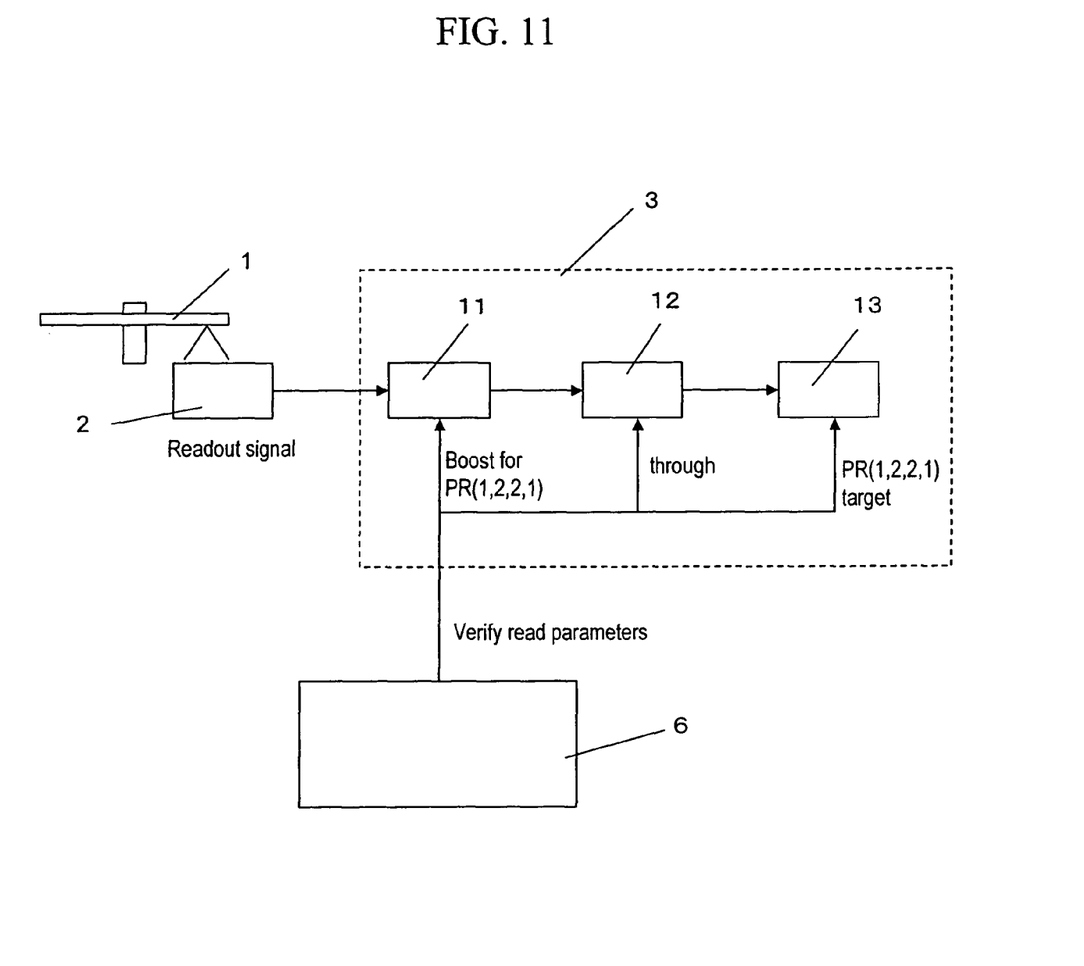
FIG. 11 is a diagram showing a read channel setting at the time of verify.

FIG. 11 shows a read channel setting when a verify is performed. Main component blocks of the read channel are a $7^{th}$ order equi-ripple equalizer 11, an adaptive equalizer 12 and an adaptive Viterbi decoder 13. The settings in normal playback and the read retry thereof are as described above and in Japanese Patent Laid-Open No. Hei 11 (1999)-296987.

As described above, at the time of verify, it is necessary to assume the lowest level of channel performance realized by other apparatuses, and to secure a margin for compatibility. In the case of the BD, for recording quality and the like required to secure the compatibility, it is specified to use a read channel using a limit-equalizer. However, in an actual drive, it is anticipated that a PRML excellent in decode performance is used in many cases. Therefore, the verify is performed by use of the most primitive PRML channel for the BD. In the case of the BD (25 GByte/side), an adaptive PR-class is PR (1, 2, 2, 1) ML. Moreover, for equalization, only the $7^{th}$ order equi-ripple equalizer is used. Thus, the adaptive equalizer stops adaptive equalization and sets frequency characteristics of amplitude and phase to be flat. Consequently, for example, if a degree of asymmetry becomes larger than the specified degree due to abnormal write power, the symbol error rate is surely increased.

Figure 12:
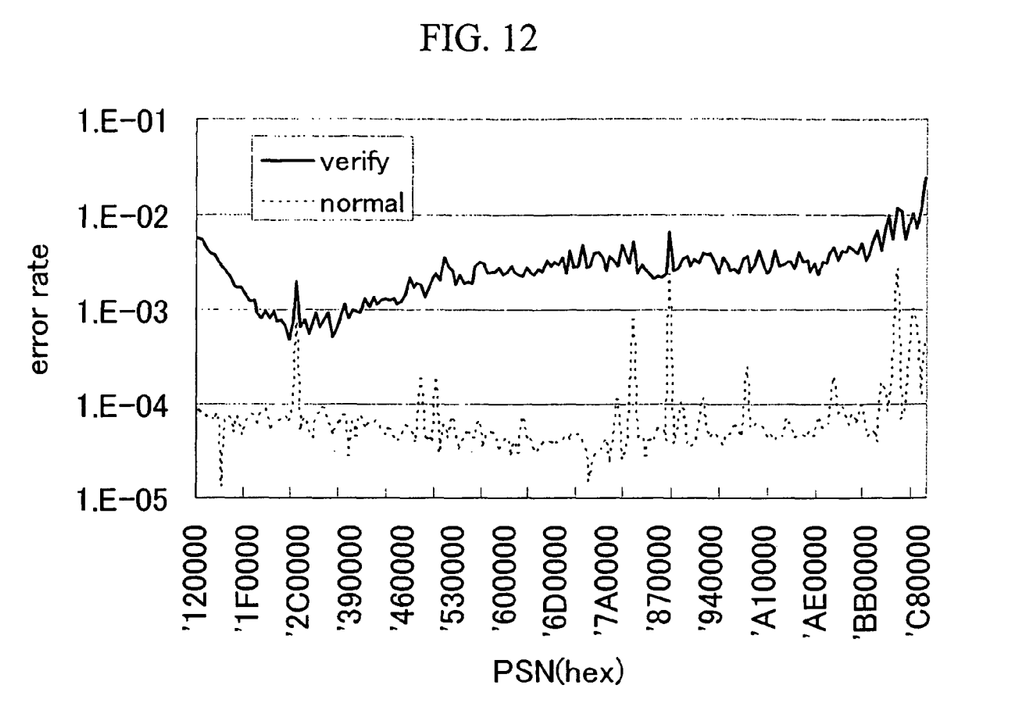
FIG. 12 is a diagram showing a result of error rate measurement by a verify setting.
Figure 13:
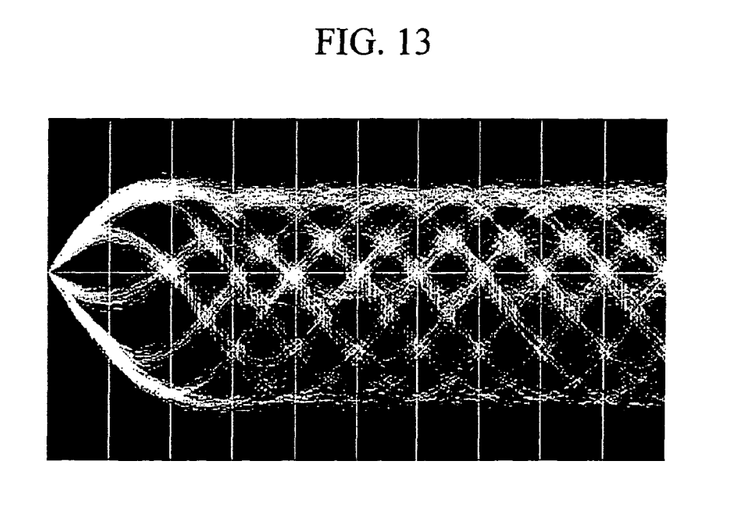
FIG. 13 is a diagram showing an eye-pattern of a playback signal at the time of verify error.

FIG. 12 shows an example that the setting shown in FIG. 11 is appropriate in the case of a BD-R single-layer (25 GB) medium. This example shows measurement results of symbol error rates obtained as follows. Firstly, in the BD-R single-layer (25 GB) medium, the nearly entire surface is recorded by intentionally using power smaller than a proper value, and then the BD-R single-layer medium is played back by both a normal setting and the same setting as that for the verify described above, whereby the symbol errors rates are measured. Characteristics such as recording sensitivity of the medium are not uniform. In the case of the normal playback, the influences are almost entirely eliminated by the operations of the adaptive Viterbi decoder and the adaptive equalizer. On the other hand, in the case of the playback by use of the verify setting, a difference in recording signal quality depending on a position on the medium is clearly recognized. Particularly, in an outermost circumference of the medium, a verify error is observed. This is because media sensitivity in the outermost circumference is particularly low, and thereby the asymmetry becomes very large. FIG. 13 shows a playback signal eye-pattern in a region where the verify error occurs.

Figure 14:
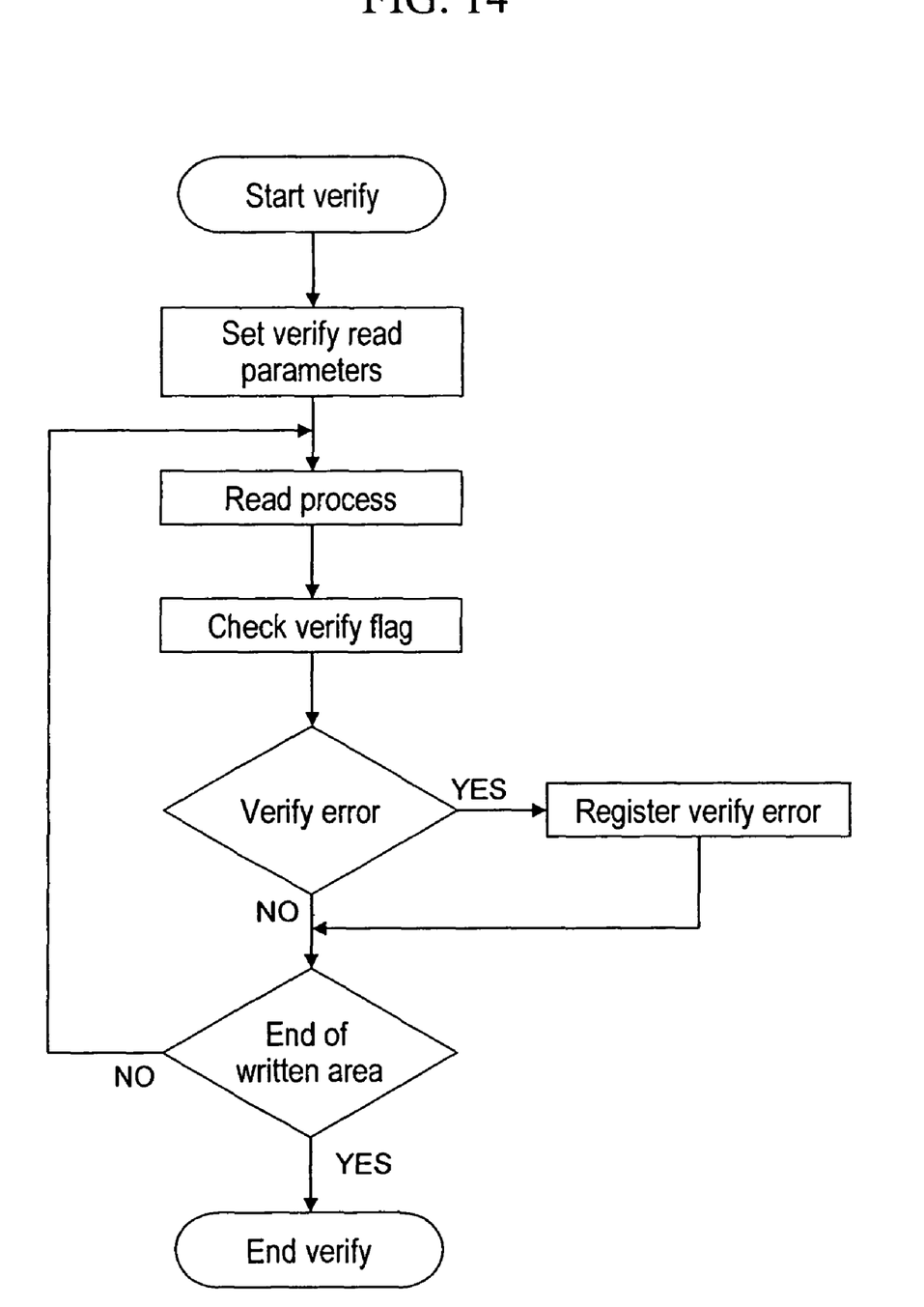
FIG. 14 is a flowchart showing a procedure of a verify.

In the case where there are a large number of RUBs to be recorded, every time when a certain number of RUBs are recorded, all RUBs which have just recorded are collectively verified. FIG. 14 shows a flowchart when the verify is performed. When 1 unit of recording is completed, playback parameters for the verify are set in the playback signal processing system, and playback is started. In the normal playback, occurrence of a read error is monitored, and appropriate processing is performed when the read error is detected. In the case of the verify, occurrence of not the read error but a verify error is monitored. In the case of the BD, a standard condition of the verify error is that at least one code word having not less than 12 symbol errors exists. When the verify error is detected, an address of the RUB is registered. The above operations are performed for all the RUBs recorded. Note that, as to the RUB in which the verify error occurs, in the case of a medium which can be overwritten, recording is tried again. If the verify error still occurs, replacement processing is performed. Moreover, in the case of a write-once medium, the replacement processing is immediately performed.

What is claimed is:

1. An optical disk apparatus comprising:
   a signal processing unit including an adaptive Viterbi decoder and an adaptive equalizer to process a readout signal from an optical disk during a playback operation;
   detecting means which detects read error factors in a recording unit block of the readout signal;
   a list in which playback operation parameters to be applied in a read retry are registered for each of the read error factors; and
   a controller which controls the playback operation and, when a read error occurs, performs the read retry by referring to the list, and by applying the playback operation parameters corresponding to the read error factor detected by the detecting means during the playback operation,
   wherein the signal processing unit further detects an isolated block followed the recording unit block that is in an unrecorded state from the readout signal, and
   wherein the controller performs the read retry on the isolated block detected by the signal processing unit.

2. The optical disk apparatus according to claim 1, wherein the detecting means further specifies a position where the read error occurs.

3. The optical disk apparatus according to claim 1, wherein the read error factors include a defect, a deviation and a signal-to-noise ratio (SNR) deficit.

4. The optical disk apparatus according to claim 1, wherein, during the read retry of the isolated block, phase comparison of a phase-locked loop (PLL) of the signal processing system is performed by use of output from an adaptive equalizer.

5. The optical disk apparatus according to claim 4, wherein the adaptive equalizer is a finite impulse response (FIR) equalizer.

* * * * *